United States Patent [19]

Li

[11] 4,136,246

[45] Jan. 23, 1979

[54] THERMOPLASTIC ACRYLONITRILE COPOLYMERS

[75] Inventor: George S. Li, Aurora, Ohio

[73] Assignee: The Standard Oil Company, Cleveland, Ohio

[21] Appl. No.: 736,889

[22] Filed: Oct. 29, 1976

[51] Int. Cl.$^2$ .................. C08F 212/34; C08F 220/42; C08F 244/00; C08F 220/48
[52] U.S. Cl. ..................... 526/267; 526/240; 526/248; 526/261; 526/268; 526/279; 526/280; 526/287; 526/316
[58] Field of Search ............... 526/248, 267, 268, 280, 526/336, 240, 261, 279; 260/63 UY, 73 R, 79.3 MU

[56] References Cited

U.S. PATENT DOCUMENTS

| | | | |
|---|---|---|---|
| 3,383,336 | 5/1968 | Kuyama et al. | 526/336 |
| 3,926,871 | 12/1975 | Hensley et al. | 526/267 |
| 3,926,926 | 12/1975 | Li et al. | 526/267 |
| 3,997,709 | 12/1976 | Aziz et al. | 526/268 |

Primary Examiner—Harry Wong, Jr.
Attorney, Agent, or Firm—John F. Jones; Larry W. Evans

[57] ABSTRACT

Thermoplastic polymeric compositions having high heat-distortion temperatures and good processability and handling characteristics which function as gas and vapor barrier materials which are composed of an olefinically unsaturated nitrile, such as acrylonitrile, indene and a polyolefinic monomer, such as divinyl benzene, are described.

8 Claims, No Drawings

THERMOPLASTIC ACRYLONITRILE COPOLYMERS

The present invention relates to novel polymeric compositions which are readily processable thermoplastics having low permeability to gases and vapors, and more particularly pertains to readily processable thermoplastic polymeric compositions having high heat-distortion temperatures which function as gas and vapor barrier materials and are composed of an olefinically unsaturated nitrile, indene or coumarone or mixtures of indene and coumarone and a polyolefinic monomer and to a novel process for preparing same.

The compositions and process of this invention represent an improvement over the compositions and process described in U.S. Pat. No. 3,926,926. The compositions of the present invention are of improved physical properties over the olefinic nitrile-indene copolymers described in U.S. Pat. No. 3,926,926, particularly in respect to the properties of ASTM heat-distortion temperature and processing and handling characteristics in molding and thermoforming of articles therefrom.

The novel products of the present invention are prepared by polymerizing a major proportion by weight of an olefinically unsaturated nitrile, such as acrylonitrile, a minor proportion by weight of indene or coumarone or mixtures of indene and coumarone, and a minor proportion by weight of a polyolefinic monomer, such as divinyl benzene.

The olefinically unsaturated nitriles useful in the present invention are the alpha, beta-olefinically unsaturated mononitriles having the structure

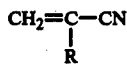

wherein R is hydrogen, a lower alkyl group having from 1 to 4 carbon atoms, or a halogen. Such compounds include acrylonitrile, alpha-chloroacrylonitrile, alpha-fluoro-acrylonitrile, methacrylonitrile, ethacrylonitrile, and the like. The most preferred olefinically unsaturated nitrile in the present invention is acrylonitrile.

Indene (1-H-indene) and coumarone (also known as benzofuran) and mixtures thereof are employed in minor proportions in the novel copolymers of this invention. Indene, for instance, is an inexpensive, commercially available monomer which is a by-product of coke operations, such as steel mills, and can also be obtained from petroleum in a refinery by the steam cracking of naphtha.

The polyolefinic monomers useful in the present invention are those monomers containing at least two polymerizable carbon-to-carbon double bonds. Exemplary polyolefinic monomers useful in this invention are polymerizable compounds which contain a plurality of polymerizable

groupings including divinyl benzene, trivinyl benzene, divinyl naphthalene, triallyl cyanurate, methylene-bis-acrylamide, methylene-bis-methacrylamide, triacrylyl triazine, trimethacrylyl triazine, hexaallyl trimethylene trisulfone, tetraallyl methane, tetrabutenyl methane, tetraallyl silane, tetravinyl silane, tetraallyl germane, tetravinyl germane, ethylene glycol diacrylate, pentaerythritol tetra acrylate, allyl acrylate, allyl cinnamate, diallyl maleate, diallyl phthalate, divinyl ether, diallyl ether, 3,9-divinyl-2,4,8,10-tetraoxospiro [5,5] undecane, divinyl ketone, polyalkenyl polyethers of polyhydric alcohols such as polyallyl sucrose, tetraallyl pentaerythritol, and the like. Most preferred because of its ready availability and relatively low cost is divinyl benzene.

The polymeric compositions of the present invention can be prepared by any of the known general techniques of polymerization including the bulk polymerization, solution polymerization, and emulsion or suspension polymerization techniques by batch, continuous or intermittent addition of the monomers and other components. The preferred method is in aqueous medium by emulsion or suspension polymerization to produce a latex or dispersion of the resinous copolymer.

The polymerization process of this invention is preferably carried out in aqueous medium in the presence of an emulsifier or a suspending agent and a free-radical generating polymerization initiator at a temperature in the range of from about 0° to 100° C. in the substantial absence of molecular oxygen. It is not necessary to use a molecular weight modifier, such as a mercaptan, in the polymerization reaction to control the molecular weight of the polymer to within the desired limits.

The preferred polymeric compositions embodied in the present invention are those resulting from the polymerization of (A) at least 50% by weight of an olefinic nitrile having the structure

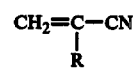

wherein R has the foregoing designation, (B) up to 50% by weight of at least one member selected from the group consisting of indene and coumarone, and (C) from 0.5 to 3% by weight of a polyolefinic monomer.

More specifically, this invention can be illustrated in the polymerization of a mixture of a major proportion of acrylonitrile, a minor proportion of indene, and a minor proportion of divinyl benzene to produce a resinous product which has an ASTM heat-distortion temperature of 100° C. or higher. This product also is readily processed into articles such as bottles, sheets, films, and the like, which can be oriented by stretching if desired. These articles have excellent impermeability to gases and vapors and also have excellent resistance to creep under stress or load.

Preferably, the acrylonitrile-indene-polyolefinic monomer copolymers of this invention should contain from 50 to 90% by weight of acrylonitrile, 10 to 50% by weight of indene and 0.5 to 2% by weight of the polyolefinic monomer.

In the following illustrative examples, the amounts of ingredients are expressed in parts by weight unless otherwise indicated.

EXAMPLE 1

A. A copolymer of acrylonitrile and indene which is outside the scope of the present invention was prepared in aqueous suspension using the following ingredients:

| Ingredient | Parts |
|---|---|
| water | 250 |
| acrylonitrile | 65 |
| indene | 35 |
| hydroxyethyl cellulose | 0.2 |
| Vazo 52 (2,2'-azo-bis (2,4 dimethyl valeronitrile) sold by Du Pont) | 0.6 |

All of the acrylonitrile, water, hydroxyethyl cellulose and 0.2 part of Vazo 52 was placed in a polymerization reactor. The reactor was purged with nitrogen and the polymerization was carried out at about 65° C. with stirring. The indene was added continuously to the reactor during the polymerization period (7.5 hours). Two 0.2-part portions of Vazo 52 were added during the polymerization. One portion was added after 2.5 hours and the second portion was added after 5 hours of polymerization. After all of the indene had been added, the reaction temperature was raised to 72° C. and stirring was continued at 72° C. for an additional hour. The resulting resin was isolated by filtration and was dried. The resin was found to have a Brabender plasticorder torque at 230° C. and 35 rpm of 540 meter grams, an ASTM heat-distortion temperature of 124° C. and an ASTM D-785 hardness of 110 (M). This resin could not be pressed into films because of its extreme brittleness.

B. A terpolymer of acrylonitrile, indene and divinyl benzene was prepared in accordance with the procedure of A above using the following ingredients:

| Ingredient | Parts |
|---|---|
| wter | 250 |
| acrylonitrile | 65 |
| indene | 35 |
| divinyl benzene (50% active) | 1 |
| hydroxyethyl cellulose | 0.2 |
| Vazo 52 | 0.6 |

The water, acrylonitrile, hydroxyethyl cellulose, divinyl benzene and 0.2 part of Vazo 52 were placed in the polymerization reactor, and the indene and remainder of the Vazo 52 were added as in A above. The resulting resin was found to be soluble in hot acetone and to have a Brabender torque of 1010 meter grams at 230° C. and 35 rpm, an ASTM heat-distortion temperature of 126° C. and an ASTM D-785 hardness of 112 (M). This resin could be pressed into films which were not very brittle and could be oriented by stretching. A film of this resin was found to have the following barrier properties:

| water vapor transmission | 4.0 gm-mil/ 100 inches²/ atmosphere/ 24 hours |
|---|---|

EXAMPLE 2

The procedure of Example 1B was repeated using 4 parts of divinyl benzene. The resulting resin appeared to be insoluble in hot acetone and to be cross-linked.

EXAMPLE 3

The procedure of Example 1B was repeated using 200 parts of water. The resulting resin was found to be soluble in hot acetone and to have a Brabender torque of 1550 meter grams, an ASTM heat-distortion temperature of 128° C. and an ASTM D-785 hardness of 121 (M). This resin had the following barrier properties:

| water vapor transmission | 2.4 |
|---|---|
| oxygen transmission | 0.97 |

EXAMPLE 4

A terpolymer of acrylonitrile, indene and divinyl benzene was prepared according to Example 1B using the following ingredients:

| Ingredient | Parts |
|---|---|
| water | 200 |
| acrylonitrile | 70 |
| indene | 30 |
| divinyl benzene | 1 |
| hydroxyethyl cellulose | 0.2 |
| Vazo 52 | 0.6 |

The water, acrylonitrile, divinyl benzene, hydroxyethyl cellulose, 0.2 part of Vazo 52 and 11.5 parts of indene were placed in the reactor initially. The polymerization was carried out as in Example 1B continuously adding the remaining 18.5 parts of indene and 0.4 part of Vazo 52. The resinous product had the following barrier properties:

| water vapor transmission | 2.8 |
|---|---|
| oxygen transmission | 0.64 |

EXAMPLE 5

A terpolymer of 65/35/1 of acrylonitrile, indene and 3,9-divinyl-2,4,8,10-tetraoxospiro [5,5] undecane was prepared similar to Example 3. The resin was found to be soluble in hot acetone and to have a Brabender torque of 1200 meter grams and an ASTM heat-distortion temperature of 131° C.

I claim:
1. The polymer resulting from the polymerization of
   (A) from 50 to 90% by weight of an olefinic nitrile having the structure

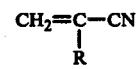

wherein R is hydrogen, a lower alkyl group having from 1 to 4 carbon atoms, or a halogen,
   (B) from 9.5 to 49.5% by weight of at least one member selected from the group consisting of coumarone and indene, and
   (C) from 0.5 to 3% by weight of a polyolefinic monomer which contains a plurality of polymerizable

groupings and is selected from the group consisting of divinyl benzene, trivinyl benzene, divinyl naphthalene, triallyl cyanurate, methylene-bis-acrylamide, methylene-bis-methacrylamide, triacrylyl triazine, trimethacrylyl triazine, hexaallyl trimethylene trisulfone, tetraallyl methane, tetrabutenyl methane, tetraallyl silane, tetravinyl silane, tetraallyl germane, tetravinyl germane, ethylene glycol diacrylate, pentaerythritol tetra acrylate, allyl acrylate, allyl cinnamate, diallyl maleate, diallyl phthalate, divinyl ether, diallyl ether, 3,9-divinyl-2,4,8,10-tetraoxospiro [5,5] undecane, divinyl ketone and polyalkenyl polyethers of polyhydric alcohols 2. The polymer of claim 1 wherein (A) is acrylonitrile.

3. The polymer of claim 2 wherein (B) is indene.

4. The polymer of claim 3 wherein (C) is divinyl benzene.

5. The process comprising polymerizing in an aqueous medium in the presence of a free radical initiator and in the substantial absence of molecular oxygen (A) from 50 to 90% by weight of an olefinic nitrile having the structure

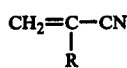

wherein R is hydrogen, a lower alkyl group having from 1 to 4 carbon atoms, or a halogen, (B) from 9.5 to 49.5% by weight of at least one member selected from the group consisting of coumarone and indene, and (C) from 0.5 to 3% by weight of a polyolefinic monomer which contains a plurality of polymerizable

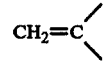

groupings and is selected from the group consisting of divinyl benzene, trivinyl benzene, divinyl naphthalene, triallyl cyanurate, methylene-bis-acrylamide, methylene-bis-methacrylamide, triacrylyl triazine, trimethacrylyl triazine, hexaallyl trimethylene trisulfone, tetraallyl methane, tetrabutenyl methane, tetraallyl silane, tetravinyl silane, tetraallyl germane, tetravinyl germane, ethylene glycol diacrylate, pentaerythritol tetra acrylate, allyl acrylate, allyl cinnamate, diallyl maleate, diallyl phthalate, divinyl ether, diallyl ether, 3,9-divinyl-2,4,8,10-tetraoxospiro [5,5] undecane, divinyl ketone and polyalkenyl polyethers of polyhydric alcohols 6. The process of claim 5 wherein (A) is acrylonitrile.

7. The process of claim 6 wherein (B) is indene.

8. The process of claim 7 wherein (C) is divinyl benzene.

* * * * *